United States Patent
von Novak, III

(10) Patent No.: US 10,742,071 B2
(45) Date of Patent: Aug. 11, 2020

(54) WIRELESS POWER TRANSFER FOR STATIONARY APPLICATIONS

(71) Applicant: QUALCOMM Incorporated, San Diego, CA (US)

(72) Inventor: William Henry von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 15/410,541

(22) Filed: Jan. 19, 2017

(65) Prior Publication Data

US 2018/0205263 A1    Jul. 19, 2018

(51) Int. Cl.
| | |
|---|---|
| *H02J 50/12* | (2016.01) |
| *H01F 38/14* | (2006.01) |
| *H02J 3/38* | (2006.01) |
| *H02J 50/80* | (2016.01) |
| *H02J 7/02* | (2016.01) |
| *H02J 7/35* | (2006.01) |

(52) U.S. Cl.
CPC .............. *H02J 50/12* (2016.02); *H01F 38/14* (2013.01); *H02J 3/383* (2013.01); *H02J 7/025* (2013.01); *H02J 7/35* (2013.01); *H02J 50/80* (2016.02)

(58) Field of Classification Search
CPC ............ H01F 38/14; H02J 7/025; H02J 3/383
See application file for complete search history.

(56) References Cited

U.S. PATENT DOCUMENTS

| | | | |
|---|---|---|---|
| 4,761,724 A | 8/1988 | Brown et al. | |
| 6,208,531 B1 | 3/2001 | Vinciarelli et al. | |
| 8,629,576 B2* | 1/2014 | Levine | H02J 5/005 307/104 |
| 9,035,499 B2* | 5/2015 | Kesler | B60L 53/52 307/104 |
| 2002/0141208 A1* | 10/2002 | Nanbu | H02J 7/025 363/37 |
| 2009/0127937 A1* | 5/2009 | Widmer | H01F 38/14 307/149 |

(Continued)

FOREIGN PATENT DOCUMENTS

CN           203788157 U      8/2014

*Primary Examiner* — Jared Fureman
*Assistant Examiner* — Emmanuel Dominique
(74) *Attorney, Agent, or Firm* — Colby Nipper

(57) ABSTRACT

The present disclosure describes aspects of wireless power transfer for stationary applications. In some aspects, a system includes a transmitter and receiver separated by a wireless gap with a membrane. The transmitter has an inverter circuit to invert direct current (DC) power from a DC power source to alternating current (AC) power. The transmitter also has a transmitting circuit that includes a first resonant coil configured to resonate at a frequency of the AC power. The first resonant coil is also configured to wirelessly transmit the AC power across the wireless gap. The receiver has a receiving circuit that includes a second resonant coil configured to resonate based on resonance of the first resonant coil and to receive the wirelessly transmitted AC power. Additionally, the first and second resonant coils are configured as primary and secondary windings, respectively, of a transformer to transform the wirelessly transmitted AC power.

30 Claims, 7 Drawing Sheets

(56) References Cited

U.S. PATENT DOCUMENTS

| | | | |
|---|---|---|---|
| 2009/0243394 A1* | 10/2009 | Levine | H02J 5/005 307/104 |
| 2009/0284220 A1* | 11/2009 | Toncich | H01F 38/14 320/108 |
| 2011/0037322 A1* | 2/2011 | Kanno | H02J 7/025 307/104 |
| 2011/0297844 A1* | 12/2011 | Vecziedins | H01J 5/62 250/432 R |
| 2012/0007435 A1* | 1/2012 | Sada | H02J 50/12 307/84 |
| 2012/0086281 A1* | 4/2012 | Kanno | H01Q 3/26 307/82 |
| 2012/0098350 A1* | 4/2012 | Campanella | H01F 38/14 307/104 |
| 2013/0099587 A1* | 4/2013 | Lou | H02J 50/12 307/104 |
| 2014/0183969 A1* | 7/2014 | Cook | H01F 38/14 307/104 |
| 2015/0280455 A1 | 10/2015 | Bosshard et al. | |
| 2015/0341085 A1 | 11/2015 | Ettes et al. | |
| 2015/0380944 A1 | 12/2015 | Yu et al. | |
| 2016/0056639 A1 | 2/2016 | Mao | |
| 2016/0164346 A1 | 6/2016 | Zhang | |
| 2017/0093167 A1 | 3/2017 | Von Novak, III et al. | |

\* cited by examiner

WIRELESS POWER TRANSFER FOR STATIONARY APPLICATIONS

FIELD OF THE DISCLOSURE

This disclosure relates generally to wireless power transfer systems. More particularly, the disclosure relates to transforming power across a wireless gap along with transferring the power across the wireless gap.

BACKGROUND

This description of related art is provided for the purpose of generally presenting a context for the disclosure that follows. Unless indicated otherwise herein, concepts described in this section are not prior art to this disclosure and are not admitted to be prior art by inclusion herein.

Amid growing concerns over non-renewable energy sources, efforts have been made to develop technologies to harness renewable energy and to increase its efficiency. Grid-tie inverters are common in the growing renewable energy industry, for instance. In general, grid-tie inverters convert direct current (DC) voltage generated by photovoltaic panels into alternating current (AC), as used by a power grid. Oftentimes, grid-tie inverters include safety mechanisms to avoid "backfeeding" the grid when there is a fault in the system. The term "backfeeding" refers to a situation that occurs when electric power is being induced into a local power grid, causing power to flow in an opposite direction from the usual flow of power. Further, grid-tie inverters are typically configured as one of two different types—batteryless inverters that perform a direct conversion, and battery-based inverters capable of providing some autonomy. Broadly speaking, batteryless inverters directly convert high voltage from photovoltaic arrays to AC. In contrast, battery-based inverters typically first convert voltage from photovoltaic arrays to a lower voltage suitable for battery charging, and then convert the battery voltage to AC power to be backfed to the grid. In some cases, there may be advantages to providing energy across a membrane, such as to recharge pressure-sealed devices, enable rapid setup of renewable power sources through windows, walls, roofs, ceilings, floors, and so forth.

SUMMARY

In some aspects of wireless power transfer for stationary applications, a system includes a transmitter and a receiver separated by a wireless gap that includes a membrane. The transmitter has an inverter circuit that is configured to invert direct current (DC) power obtained from a DC power source to alternating current (AC) power. The transmitter also has a transmitting circuit that includes a first resonant coil configured to resonate at a frequency of the AC power. The first resonant coil is also configured to wirelessly transmit the AC power across the membrane of the wireless gap. The receiver has a receiving circuit that includes a second resonant coil, which is configured to resonate based on resonance of the first resonant coil and to receive the wirelessly transmitted AC power. Additionally, the first and second resonant coils are configured as primary and secondary windings, respectively, of a transformer to transform, across the wireless gap, the wirelessly transmitted AC power. In particular, the first and second resonant coils are configured to transform the wirelessly transmitted AC power from a first voltage at the first resonant coil to a second voltage at the second resonant coil, such as to a voltage that is suitable for use by a power recipient.

Some aspects of wireless power transfer for stationary applications also involve a method in which power is wirelessly transferred and transformed across a wireless gap that includes a membrane. The method comprises inverting direct current (DC) power to alternating current (AC) power by an inverter circuit disposed in a transmitter. The method also includes supplying the AC power to a transmitting circuit disposed in the transmitter. This AC power causes a first resonant coil disposed in the transmitting circuit to resonate and to propagate a wireless field to a receiver located across the membrane of the wireless gap. Further, the method includes coupling to the wireless field by a second resonant coil of a receiving circuit disposed in the receiver. The coupling causes the second resonant coil to resonate and to receive the AC power at the receiver. In addition to transferring the AC power, the method includes transforming the AC power across the wireless gap from a first voltage at the first resonant coil to a second voltage at the second resonant coil. This transformation is carried out by using the first and second resonant coils as primary and secondary windings, respectively, of a transformer.

In other aspects, a method for configuring a system to wirelessly transfer and transform power across a wireless gap comprises disposing an inverter circuit in a transmitter to invert direct current (DC) power to generate alternating current (AC) power. The method also comprises disposing a transmitting circuit in the transmitter to transmit the AC power generated by the inverter circuit. The transmitting circuit includes a first resonant coil that is configured to resonate based on the AC power generated by the inverter circuit. The first resonant coil is also configured to wirelessly transmit the AC power across the wireless gap. Further, the method comprises disposing a receiving circuit in a receiver that is configured to be separated from the transmitter by the wireless gap. The receiving circuit includes a second resonant coil that is configured to resonate based on the resonance of the first resonant coil and to receive the wirelessly transmitted AC power at the receiver. In addition, the method comprises tuning the transmitting circuit and the receiving circuit to enable the first and second resonant coils to serve as primary and secondary windings, respectively, of a transformer. In accordance with the described aspects, the transformer is configured to transform the wirelessly transmitted AC power from a first voltage and frequency at the first resonant coil to a second voltage and frequency at the second resonant coil.

In some aspects, an apparatus can wirelessly transfer and transform power across a wireless gap that includes a membrane. The apparatus includes an inverting means for inverting direct current (DC) power obtained from a DC power source to alternating current (AC) power. The apparatus also includes a transmitting means coupled to the inverting means and having a first resonant means. The first resonant means resonates near a frequency of the AC power generated by the inverting means to wirelessly transmit the AC power across the membrane of the wireless gap. Further, the apparatus includes a receiving means that is separated from the transmitting means by the wireless gap and has a second resonant means. The second resonant means resonates based on resonance of the first resonant means to receive the wirelessly transmitted AC power. In accordance with the described aspects, the first and second resonant means are also for transforming, across the wireless gap, the wirelessly transmitted AC power from a first voltage and frequency at the first resonant means to a second voltage and frequency at the second resonant means, such that the second voltage is suitable for use by a power recipient.

BRIEF DESCRIPTION OF DRAWINGS

The details of various aspects are set forth in the accompanying figures and the detailed description that follows. In the figures, the left-most digit of a reference number identifies the figure in which the reference number first appears. The use of the same reference numbers in different instances in the description or the figures indicates like elements.

DETAILED DESCRIPTION

Figure 1:
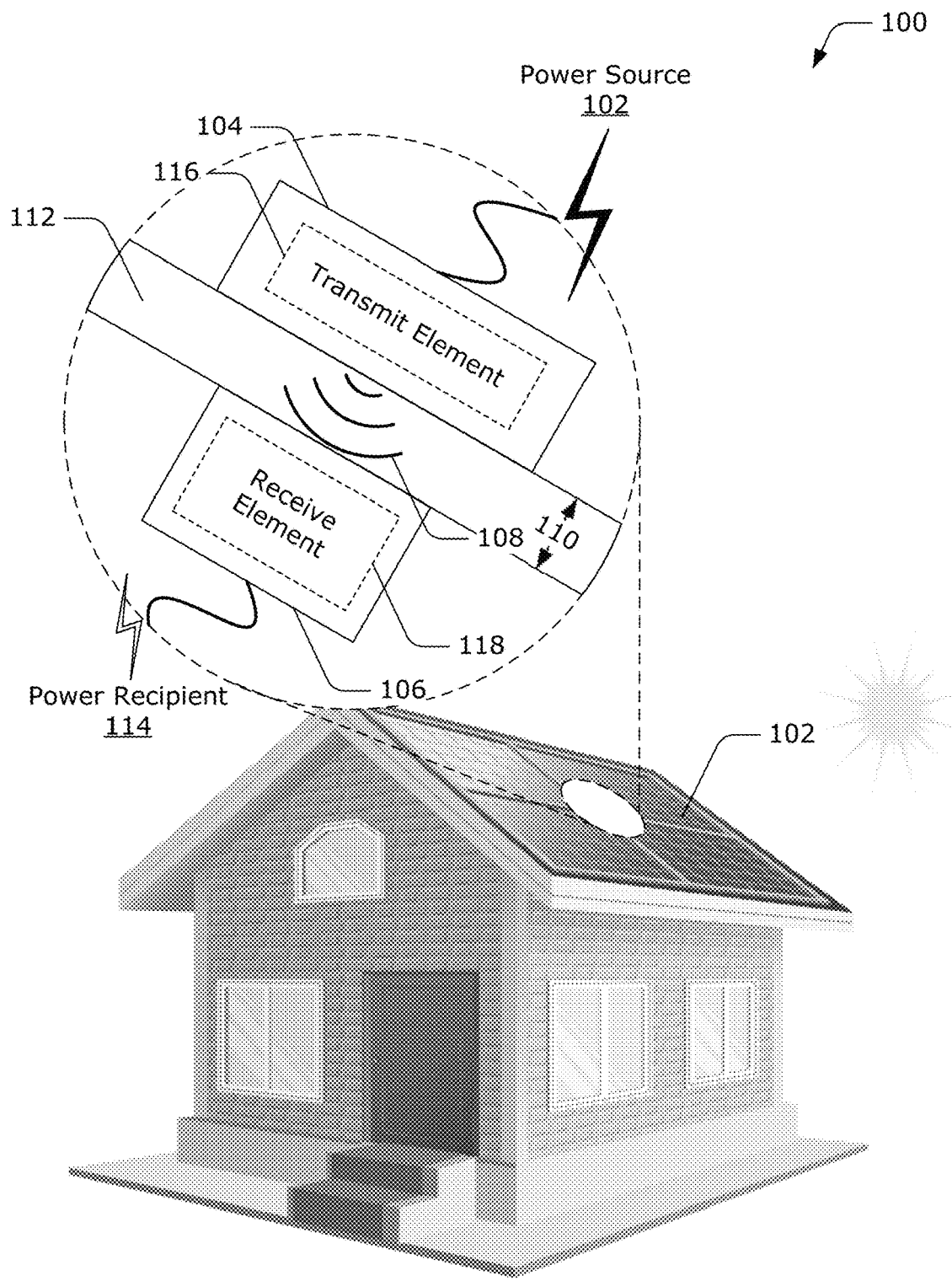
FIG. 1 illustrates an example environment that includes a stationary application of wireless power transfer.

In many cases, it may be desirable to send power through membranes intended to provide sealing against water, air, pressure, pathogens, and so on. By way of example, consider a scenario in which home renters rent a solar power system to power the home. Having a simple way to mount and take down the solar power system is likely preferred by the renters, so that the system can be removed easily at the end of a rental period. Further, sending power through structural or decorative surfaces without penetrating those surfaces may reduce the cost and time associated with mounting and taking down such systems.

This disclosure describes aspects of transferring power wirelessly for stationary applications. The apparatuses and methods described herein involve not only transferring power across a wireless gap, but also transforming the power across the wireless gap. In general, system transformers may be used to provide isolation or voltage scaling, and are required in many grid-tied inverters or alternating current (AC) to direct current (DC) power systems. Conventional approaches typically use a separate device to transform power than is used to transfer the power across a wireless gap. In contrast to conventional approaches, the described aspects provide a combined wireless power transfer system and system transformer.

To both transfer and transform power over a wireless gap, the described aspects utilize a resonant coil of a transmitting circuit and a resonant coil of a receiving circuit. The transmitter-side resonant coil wirelessly transmits the power across the wireless gap via generating a wireless field. A receiver-side resonant coil is configured to generate a current in response to the wireless field effective to receive the wirelessly transmitted power.

While transmitting and receiving power, the transmitter-side resonant coil and the receiver-side resonant coil also act as primary and secondary windings, respectively, of a transformer, e.g., a transformer having an air core. The transformer that is formed using these coils transforms the wirelessly transmitted power across the wireless gap. In particular, the transformer is configured to transform the wirelessly transmitted power from a first voltage at the transmitter-side resonant coil to a second voltage at the receiver-side resonant coil. Accordingly, the transmitter-side resonant coil and the receiver-side resonant coil are capable of providing voltage scaling for the transmitting and receiving circuits.

By both transferring and transforming power across wireless gaps—including gaps having a membrane—the described aspects obviate the need for separate system transformers in stationary wireless-power transfer applications. In particular, the combined functionality enables the techniques to wirelessly transfer power across a membrane—such as a roof, including a waterproofing layer, a glass layer, a water interface, or an air interface—without inserting a separate transformer in the transmitter or receiver. As used herein, the term "membrane" refers to a physical barrier between a wireless power transmitter and a wireless power receiver. In addition to the examples noted above, membranes may also be physical barriers capable of sealing against water, air, pressure, pathogens, and so forth. Further, not only do the transmitter-side resonant coil and the receiver-side resonant coil provide voltage scaling, but also provide isolation for power recipients connected to output of the receiving circuit. In an example where the output is connected to a power grid, such as one operated by a utility company, this isolation can improve safety and help prevent "backfeeding" the power grid when there is a fault.

The aspects described herein thus involve a reduced amount of equipment to both transfer and transform power across wireless gaps relative to conventional approaches. The described aspects are also capable of taking high-voltage DC power from a power source (e.g., solar panels) as input and outputting AC power that is compatible with power grids. Due at least in part to the reduced amount of equipment, the described aspects can be used to set up wireless power transfer systems more easily than conventional techniques. Consequently, the described aspects are suitable for a variety of different situations where wireless power transfer may be desired, such as power transfer from a renewable energy source outside a structure to within the structure, recharging pressure-sealed devices (like underwater radio operated vehicles (ROVs)), power transfer into a quarantined structure across membranes forming the structure, and so forth.

These and other aspects of wireless power transfer for stationary applications are described below in the context of an example environment, example arrangements and configurations of wireless power transfer systems, and techniques. Any reference made with respect to the example environment or wireless power transfer systems, or elements thereof, is by way of example only and is not intended to limit any of the aspects described herein.

Example Environment

FIG. 1 illustrates an example environment 100, which includes input power source 102. In this particular example, the input power source 102 is illustrated as solar panels on a house, however, a variety of different types of sources are contemplated within the spirit and scope of the aspects described herein.

The example environment also includes transmitter 104 and receiver 106, which together form a system for wirelessly transferring power across a wireless gap and transforming the power across the wireless gap. In accordance with the described aspects, the power source 102 supplies power to the transmitter 104, e.g., over a wired coupling. The transmitter 104 uses the power from the power source 102 to generate wireless field 108. The wireless field 108 can be magnetic, electromagnetic, or correspond to some other signal that is usable to transfer power from the transmitter 104 to the receiver 106. In accordance with one or more aspects, the receiver 106 couples to the wireless field 108 to enable energy transfer.

Through the coupling with the wireless field 108, the receiver 106 is capable of generating output power for storing or consumption by at least one power recipient 114. The power recipient 114 may be configured as any of a variety of different devices, appliances, power storage units (e.g. batteries), and so forth. The power recipient 114 may also be tied to a power grid, such as a power grid operated by a utility company. In general, the power recipient 114 represents an assembly capable of being powered with the power generated by the receiver 106 via the coupling to the wireless field 108.

In accordance with one or more aspects, the transmitter 104 and the receiver 106 are separated by distance 110. The distance 110 between the transmitter 104 and the receiver 106 may be referred to herein as a "wireless gap." The wireless gap corresponds to a space across which the transmitter 104 and the receiver 106 are not wired together for power or data transfer, but across which power is wirelessly transferred from the transmitter 104 to the receiver 106. In the example environment, membrane 112 is disposed between the transmitter 104 and the receiver 106. Although the distance 110 between the transmitter 104 and the receiver 106 corresponds to a thickness of the membrane 112 in the depicted example, in other aspects the distance 110 may be different (e.g., greater) than a thickness of the membrane 112. Accordingly, the wireless gap may include a membrane, but is defined by the distance 110 between the transmitter 104 and the receiver 106—rather than simply a thickness of the membrane. In some aspects, the application may be a stationary application where the transmitter 104 and the receiver 106 are generally in a fixed (e.g., immovable) position such that the distance 110 generally does not change.

The transmitter 104 is illustrated with a power transmitting element 116, which is capable transmitting energy or otherwise coupling to the receiver 106 for energy transfer. The receiver 106 is illustrated with a power receiving element 118, which is capable of receiving or capturing energy, or otherwise coupling to the transmitter 104 for the energy transfer. In aspects, the transmitter 104 and the receiver 106 are configured according to a mutually resonant relationship. When the resonant frequency of the transmitter 104 and the receiver 106 are substantially the same or very close (within a range of frequencies), transmission losses between the transmitter 104 and the receiver 106 are reduced. This mutual resonant relationship enables wireless power transfer between the transmitter 104 and the receiver 106, even when the distance 110 is large. Resonant inductive coupling techniques may thus allow for improved efficiency and power transfer over various fixed distances and using a variety of inductive power transmitting and receiving element configurations, e.g., different configurations capable of conditioning power from different types of power sources, conditioning power output to different types of power recipients, and so forth. Although aspects disclosed herein may be generally directed to resonant wireless power transfer, persons of ordinary skill will appreciate that aspects disclosed herein may be used in non-resonant implementations for wireless power transfer.

In some aspects, the wireless field 108 corresponds to a "near field" of the transmitter 104. As used herein, the term "near field" refers to a region in which there are strong couplings between the power receiving element 118 and the power transmitting element 116. In particular, the near field may correspond to a region within approximately one wavelength (or a fraction thereof) of the power transmitting element 116. In some aspects, energy may be efficiently transferred by coupling at least a threshold portion of the energy in the wireless field 108 to the power receiving element 118 rather than propagating a majority of the energy in an electromagnetic wave to a far field.

The transmitter 104 also represents functionality to output a time-varying magnetic (or electromagnetic) field with a frequency corresponding to the resonant frequency of the power transmitting element 116. When the receiver 106 is within the wireless field 108, the time-varying magnetic (or electromagnetic) field may induce a current in the power receiving element 118. As described above and below, the power receiving element 118 is configured as a resonant circuit to resonate at the frequency of the power transmitting element 116, which is effective to cause energy to be efficiently transferred. Additionally, an alternating current (AC) signal induced in the power receiving element 118 may be rectified to produce a direct current (DC) signal. The produced DC signal may then be used to supply power to the power recipient 114.

In general, the transmitter 104 and the receiver 106 represent functionality not only to wirelessly transfer power, but also to transform the power. The transmitter 104 and the receiver 106 each include a resonant coil to carry out this dual functionality. By way of example, the power transmitting element 116 is configured with a first resonant coil and the power receiving element 118 is configured with a second resonant coil. With regard to power transfer, the transmitter 104's resonant coil is configured to resonate to produce the wireless field 108, and the receiver 106's resonant coil is configured resonate based on the wireless field 108 to generate power at the receiver 106. The transmitter 104 and the receiver 106 are configured as or selected with functionality to transform power using the first and second resonant coils. The transmitter 104 and the receiver 106 can thus provide voltage scaling and isolation without incorporating a separate system transformer.

In accordance with the described aspects, the resonant coil of the transmitter 104 and the resonant coil of the receiver 106 form a transmitter. In particular, the resonant coil used by the transmitter 104 to produce the wireless field 108 also serves as a primary winding for the transformer. Further, the resonant coil of the receiver 106 used to generate power by coupling with the wireless field 108 also serves as a secondary winding of the transformer. This allows the transmitter 104 and receiver 106 to scale a voltage of the power obtained from the power source 102 to a different voltage for the power recipient 114. For example, this allows the transmitter 104 and the receiver 106 to scale down a voltage of high-voltage DC power (e.g., 500 volts) to a voltage of grid-compatible AC power (e.g., 240 volt RMS).

How transmitters and receivers may be specifically implemented to both wirelessly transfer and transform power across a wireless gap is described in more detail below.

Example Wireless Power Transfer Modules

Figure 2:
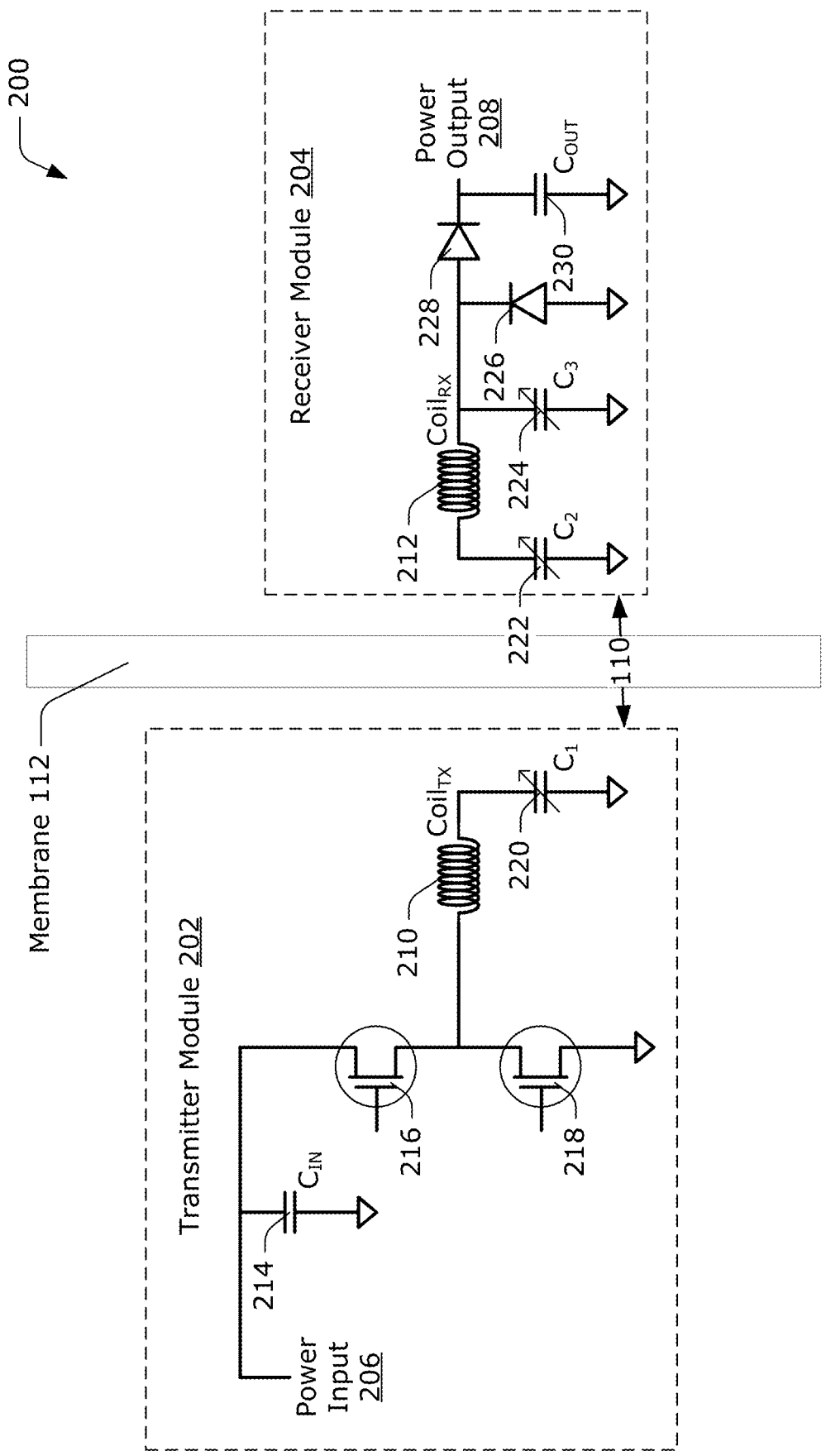
FIG. 2 illustrates an example circuit diagram of a system as shown in FIG. 1 for transforming power across a wireless gap along with transferring the power across the wireless gap.

FIG. 2 illustrates an example circuit diagram of a system as shown in FIG. 1 that is capable of transforming power across a wireless gap along with transferring the power in accordance with one or more aspects at 200. The illustrated example includes transmitter module 202 and receiver module 204. The transmitter module 202 may correspond to the transmitter 104 or components thereof, such as the power transmitting element 116. Similarly, the receiver module 204 may correspond to the receiver 106 or components thereof, such as the power receiving element 118.

The transmitter module 202 is illustrated with power input 206, which may be coupled to the power source 102. The power input 206 may have a physical, wired coupling to the power source 102, for instance. In this particular example, the transmitter module 202 is depicted having components that are capable of handling input from a DC power source. Thus, the illustrated example represents a scenario in which the power source 102 corresponds to a source of direct current (DC) power. In other words, the power input 206 of the illustrated example receives DC power from the power source 102. In other aspects, however, transmitter modules may be configured to receive alternating current (AC) power as input. To do so, these transmitter modules may be configured with different or additional components than illustrated in FIG. 2. It should therefore be appreciated that the described aspects are not limited to leveraging DC power sources.

The receiver module 204 is illustrated with power output 208, which may be coupled to the power recipient 114. The power output 208 may have a physical, wired coupling to the power recipient 114, for instance. There may be additional components (not shown) incorporated between the power output 208 and the power recipient 114, such as components configured to change characteristics of power output via the power output 208 (beyond changes induced by the illustrated components of the transmitter module 202 and the receiver module 204). In this particular example, the receiver module 204 is depicted having components that output DC power at the power output 208. In other aspects, receiver modules may be configured to output AC power, however. Such receiver modules may be configured to include an inverter, for instance, to output AC power. Thus, receiver modules may be configured with different or additional components than illustrated in FIG. 2. It should therefore be appreciated that the described aspects are not limited to outputting DC power.

Like the transmitter 104 and the receiver 106 of FIG. 1, the transmitter module 202 and the receiver module 204 are separated by the distance 110. The distance 110 defines the wireless gap between the transmitter module 202 and the receiver module 204. Also depicted in the illustrated example is the membrane 112, which may correspond to some physical barrier between the transmitter module 202 and the receiver module 204. In some aspects, the application may be a stationary application where the transmitter 104 and the receiver 106 are generally in a fixed (e.g., immovable) position such that the distance 110 generally does not change.

In accordance with the described aspects, the transmitter module 202 and the receiver module 204 each include a resonant coil to enable the dual functionality of the described system, e.g., to both wirelessly transfer and transform power across the wireless gap. The transmitter module 202 includes transmitter-side resonant coil 210 and the receiver module 204 includes receiver-side resonant coil 212. In addition to the power input 206 and the transmitter-side resonant coil 210, the transmitter module 202 is also illustrated with input capacitor 214, N-channel MOSFET (NMOS) transistors 216, 218, and tunable capacitor 220. The receiver module 204 is illustrated having tunable capacitors 222, 224, diodes 226, 228, and output capacitor 230. Although depicted and described with reference to these components, the transmitter module 202 and the receiver module 204 may be configured with different components to implement wireless power transfer for stationary applications without departing from the spirit or scope of the techniques described herein.

In aspects, the transmitter module 202 has an inverter circuit and a transmitting circuit. The inverter circuit may be disposed between the power input and the transmitting circuit. Additionally, the input capacitor 214 may be disposed between the inverter circuit and the power input 206. In the depicted example, the NMOS transistors 216, 218 form the inverter circuit, e.g., a bridge. In general, the inverter circuit is configured to invert a DC signal (e.g., a signal received from a high-voltage DC power source such as solar panels) to AC. The inverter circuit may be configured with any of a variety of components capable of inverting DC power to AC without departing from the spirit or scope of the described techniques.

The inverter circuit is further configured to supply the AC power it produces to the transmitting circuit, which includes the transmitter-side resonant coil 210 and the tunable capacitor 220. In one or more aspects, the transmitting circuit may be configured with a fixed capacitor rather than the tunable capacitor 220, such as in aspects where a resonance point is not adjusted. The transmitter-side resonant coil 210 is configured to resonate at (or near) a frequency of the AC power produced by the inverter circuit. With reference to FIG. 1, the transmitter-side resonant coil 210 is configured to resonate based on the AC power from the inverter circuit to produce the wireless field 108. This is effective to transmit the AC power across the wireless gap, including across the membrane 112.

The receiver-side resonant coil 212 and the tunable capacitors 222, 224 form a receiving circuit of the receiver module 204. In one or more aspects, the receiving circuit may also be configured with fixed capacitors rather than the tunable capacitors 222, 224, such as in aspects where a resonance point is not adjusted. The receiver-side resonant coil 212 is configured to resonate based on resonance of the transmitter-side resonant coil 210. In particular, the receiver-side resonant coil 212 is configured to resonate when exposed to the wireless field 108. Current is induced in the receiving circuit in response to the wireless field 108. By inducing this current, the receiving circuit receives the wirelessly transmitted AC power.

The received power may then flow through other components of the receiver module 204 to induce further changes to the signal. In accordance with one or more aspects, a rectifier is disposed between the receiving circuit and the power output 208. Further, the output capacitor 230 may be disposed between the rectifier and the power output 208. With reference to the illustrated example, the diodes 226, 228 can be configured to implement the rectifier of the receiver module 204. The rectifier is capable of rectifying the AC signal produced by the receiving circuit to DC power. Thus, in this example, DC power may be output from the power output 208. To enable many appliances to use the wirelessly transferred power (and condition the output power so it is compatible with a power grid), an inverter capable of inverting this DC power to AC may be coupled to the power output 208.

In addition to being used to transfer power across the wireless gap, the transmitter-side resonant coil 210 and the receiver-side resonant coil 212 are configured to form a transformer. By way of example, the transmitter-side resonant coil 210 and the receiver-side resonant coil 212 may be configured to form a transformer having an air core. In accordance with the aspects described herein, the transmitter-side resonant coil 210 serves as a primary winding of the transformer and the receiver-side resonant coil 212 serves as a secondary winding of the transformer. Further, the coils are configured such that the transformer transforms the wirelessly transmitted power from a first voltage at the transmitter-side resonant coil 210 to a second voltage at the receiver-side resonant coil 212. The second voltage may be suitable for transmission of power in stationary settings, such as transfer from outside a structure, across a barrier of the structure (e.g., roof, window, wall, floor), and to be received within the structure. In some aspects, the second voltage may be suitable for use in a power grid, such as a power grid operated by a utility company.

The transmitter-side resonant coil 210 and the receiver-side resonant coil 212 may be configured based, in part, on a particular stationary application for which they are utilized. By way of example, a size of the transmitter-side resonant coil 210 may be based on the distance 110 of the wireless gap. In a particular implementation example, the transmitter-side resonant coil 210 may have a diameter that is at least twice as long as the distance 110 of the wireless gap. Further, there may be a relationship between the structure of the transmitter-side resonant coil 210 and the receiver-side resonant coil 212. For instance, a number of turns of the receiver-side resonant coil 212 may be proportional to a number of turns of the transmitter-side resonant coil 210. The respective number of turns of the transmitter-side resonant coil 210 and the receiver-side resonant coil 212 may be based on known resonance properties to enable the mutual resonant relationship. Structure (e.g., length and number of turns) of the transmitter-side resonant coil 210 and the receiver-side resonant coil 212 may also be based on the desired power transforming capabilities of the system. For instance, a ratio of turns between the transmitter-side resonant coil 210 and the receiver-side resonant coil 212 may control the transformation, e.g., control an amount voltage is scaled. The different sizes may thus depend on the desired amount of voltage scaling that is to be achieved across the wireless gap. The transmitter-side resonant coil 210 and the receiver-side resonant coil 212 may therefore be configured in a variety of ways to achieve the described dual functionality without departing from the spirit or scope of the techniques described herein.

The tunable capacitors 220, 222, 224 may also be used to adjust characteristics of the power flowing through and between the transmitter module 202 and the receiver module 204. In particular, the tunable capacitors 220, 222, 224 may be used to adjust the characteristics based on properties of the stationary application, e.g., a distance, a material of the membrane, and so on. By way of example, the tunable capacitor 220 may be tunable to adjust a resonant frequency of the AC power at the transmitting circuit. This can reduce switching stresses on the inverter circuit (e.g., H-bridge) from inverting DC power and improve power transfer efficiency. In aspects, adjusting the tunable capacitor 220 is effective to adjust the transmitting circuit to resonance at an operating frequency.

As shown in the illustrated example, the receiver-side resonant coil 212 may be disposed between the tunable capacitors 222, 224, such that the tunable capacitor 224 is disposed between the receiver-side resonant coil 212 and the rectifier. In accordance with one or more aspects, the tunable capacitor 222 may be tunable to adjust a resonant frequency of the receiving circuit. In particular, the tunable capacitor may be tunable to adjust the resonant frequency of the receiving circuit to minimize losses at resonance.

The tunable capacitor 224 may be tunable to adjust a voltage of the power supplied by the receiving circuit. By way of example, the tunable capacitor 224 can be used in applications where a higher voltage is needed for the power supplied by the receiving circuit to the rectifier and ultimately to the power output 208. This voltage may be different than the first voltage at the transmitter-side resonant coil 210 and the second (open circuit) voltage at the receiver-side resonant coil 212, and thus correspond to a third voltage.

In some aspects, the tunable capacitors 220, 222, 224 may be fixed values chosen during design and not altered. They may also be configured to be tuned once, during installation of the system using known test tools, such as oscilloscopes, voltmeters, and so on. Alternately or in addition, the tunable capacitors 220, 222, 224 may be dynamically tuned by the system during operation. By way of example, the tunable capacitors 220, 222, 224 may be dynamically tuned by respective controllers of the transmitter module 202 and the receiver module 204—the controllers may be configured as discussed in relation to the wireless power transfer system of FIG. 7. By dynamically tuning the tunable capacitors 220, 222, 224, the system can account for occasional changes in the distance 110 between the transmitter module 202 and the receiver module 204, or changes in current or voltage characteristics of the input power sources due to changes in insolation on a solar array.

Although the example illustrated in FIG. 2 depicts components for receiving DC power at the power input 206 and outputting DC power at the power output 208, some scenarios may involve transferring AC power across a wireless gap. In other words, some scenarios may involve receiving AC power at an input of the transmitter module 202 and outputting AC power at an output of the receiver module 204. By way of example, AC power taken from a power grid may be transferred across a wall from one room of a structure to another. Consider a scenario in which a quarantined room is erected within a hospital. In this scenario, the hospital may be powered with AC power supplied by a power grid. Further, the quarantined room may be erected to minimize any holes in the room, e.g., so that pathogens cannot escape the room. To power tools and systems in the quarantined room, the AC power from one or more of the hospital's circuits may be wirelessly transferred into the quarantined room across walls or through a floor or roof of the quarantined room. Regardless of the reason, AC power is input to and output from the system. In such scenarios, a bridge rectifier may be coupled to the power input 206.

Figure 3:
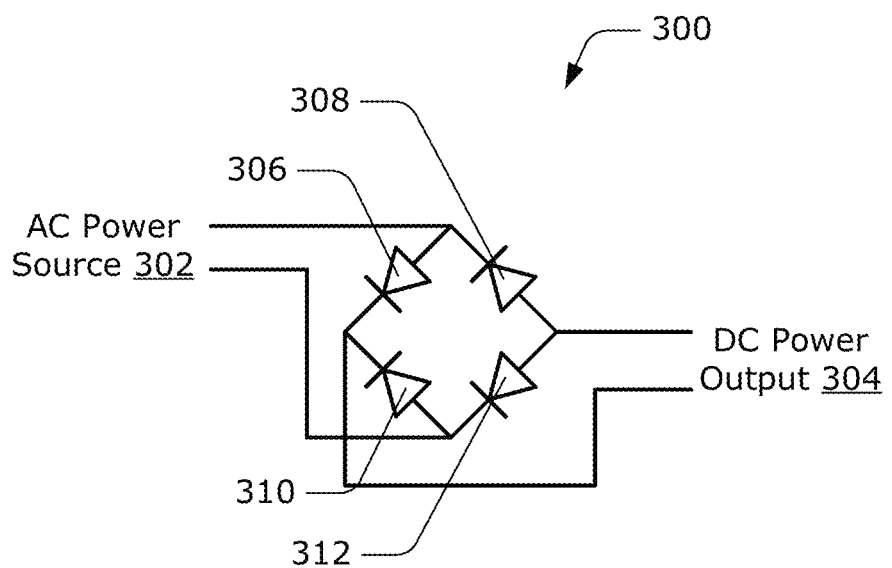
FIG. 3 illustrates an example circuit diagram of a bridge rectifier for scenarios in which an alternating current (AC) power source supplies power for transmission across the wireless gap.

FIG. 3 illustrates an example circuit diagram of a bridge rectifier in accordance with one or more aspects at 300. In general, the bridge rectifier is configured to convert AC power to pulsating DC. Thus, the bridge rectifier may be used in connection with scenarios where an AC power source supplies power for transmission across the wireless gap, e.g., the described system is used to implement an AC power bridge. Accordingly, the illustrated example includes AC power source 302, which serves as a source of power to a transmitter configured in accordance with one or more aspects.

The illustrated example also includes DC power output 304. The DC power output 304 represents that the bridge rectifier rectifies the input AC power and outputs DC power. Referring back to FIG. 2, the power input 206 of the transmitter module 202 is configured to take DC power as input. Thus, in scenarios involving an AC power source and eventual output as AC, the DC power output 304 may be coupled to the power input 206. In some aspects, the transmitter module 202 may incorporate the bridge rectifier illustrated in FIG. 3.

The bridge rectifier also includes diodes 306, 308, 310, 312, which represent functionality to rectify AC power input at the AC power source 302 to DC power for output at the DC power output 304. Although the diodes 306, 308, 310, 312 are depicted, other components arranged in known configurations capable of rectifying AC power to pulsating DC may be used to form a bridge rectifier without departing from the spirit or scope of the techniques described herein.

The bridge rectifier represents a transmitter-side component for the scenario in which AC power serves as input to the system (e.g., input to a transmitter). In addition, in a scenario where AC power is supplied as an output by the system, the system also incorporates a receiver-side component to invert DC power that is output at the power output 208 to AC power. As discussed above, DC power output at the power output 208 may further be inverted to AC power, such as for scenarios involving a DC power source (e.g., solar panels) where the power is supplied to a power grid that uses AC power.

Figure 4:
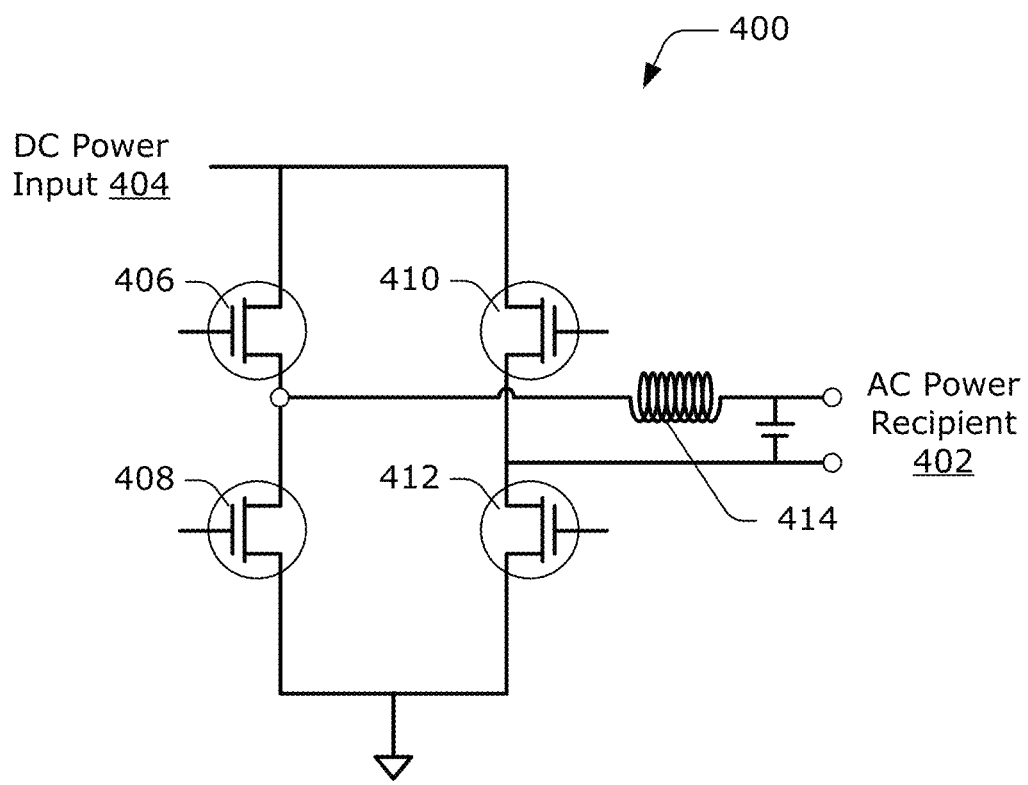
FIG. 4 illustrates an example circuit diagram of an inverter for scenarios in which pulsing direct current (DC) power is converted to AC power for output from a wireless power receiver.

FIG. 4 illustrates an example circuit diagram of an inverter in accordance with one or more aspects at 400. In general, the inverter is configured to convert DC power to AC power. Thus, the inverter may be used in scenarios where AC power is supplied to the power recipient 114, regardless of whether the power source 102 is an AC or DC power source. Such scenarios include using the described system to implement a grid-tie inverter, an AC power bridge, and so forth. Accordingly, the illustrated example includes AC power recipient 402, which serves as the recipient of the power from the receiver in accordance with one or more aspects.

The illustrated example also includes DC power input 404. The DC power input 404 represents that the inverter inverts input DC power and outputs AC power. Referring back to FIG. 2, the power output 208 of the receiver module 204 is configured to output DC power. Thus, in scenarios involving power recipients that use AC power, the power output 208 may be coupled to the DC power input 404 of the inverter. In some aspects, the receiver module 204 may incorporate the inverter, illustrated in FIG. 4, at the power output 208.

The inverter also includes transistors 406, 408, 410, 412, and resonant coil 414. These components represent functionality to invert DC power received at the DC power input 404 to AC power for output to the AC power recipient 402. Although the transistors 406, 408, 410, 412, and the resonant coil 414 are depicted, other components arranged in known configurations capable of inverting DC to AC power may be used to form the inverter without departing from the spirit or scope of the techniques described herein. In particular, components capable of regularly changing a polarity of the output may be used. In accordance with one or more aspects, the inverter may also include a filter to reduce EMI.

In aspects, the transmitter 104 and the receiver 106 are configured to communicate with each other. By way of example, the transmitter 104 and the receiver 106 may be configured to communicate to request a different voltage level at the output. Based on the communications, controllers of the transmitter 104 and the receiver 106 may dynamically adjust components, such as the tunable capacitors 220, 222, 224, to change the voltage to a different level.

This communication may be carried out in a variety of different ways. In some aspects, the transmitter 104 and the receiver 106 may communicate using any of a variety of in-band signaling techniques, such as using a change in impedance on the receiver side to signal to the transmitter. Alternately or in addition, out-of-band signaling techniques may be employed. Broadly speaking, these out-of-band signaling techniques involve using an integral communication means (e.g., a radio) to send a signal using frequencies that are different than the frequency at which the power is transmitted. By way of example, the transmitter 104 and the receiver 106 may employ out-of-band signaling techniques including ZigBee™ and Bluetooth™.

The system may also be implemented without in-band or out-of-band communication functionality. Instead, the transmitter 104 and the receiver 106 may be configured to operate without communicating with each other. In such aspects, the transmitter 104 may be configured to generate the wireless field 108 to have a constant H-field to power limits of the power source 102. In these aspects, the receiver 106 draws as much or as little power from the wireless field 108 as is being used. When the power drawn by the receiver 106 exceeds the power produced by the power source 102, the wireless field 108 will begin to decline. The transmitter 104 is configured to sense declines in the wireless field 108. When the transmitter 104 senses a decline, a controller of the transmitter 104 can dynamically adjust components, such as the tunable capacitors 222, 224, to reduce power draw accordingly.

As discussed above, the described dual functioning wireless power transfer system (e.g., the transmitter 104 and the receiver 106) may be used in a variety of different scenarios, including as a grid tie inverter, AC power bridge, and so on. These include scenarios in which the power source 102 is a source of direct current (DC) power and the power recipient 114 uses DC power. Such scenarios may be referred to as "DC-DC scenarios." These scenarios also include ones in which the power source 102 is a source of DC power, but the power recipient 114 uses AC power ("DC-AC scenarios"); ones in which the power source 102 is a source of AC power and the power recipient 114 uses AC power ("AC-AC scenarios"); and ones in which the power source 102 is a source of AC power, but the power recipient 114 uses DC power ("AC-DC scenarios").

DC-DC scenarios may involve passing DC power across a membrane while changing a voltage of the DC power using the transforming functionality of the system. One example DC-DC scenario is an off-grid power system that uses high voltage DC power on an external side of the membrane (e.g., a side with a solar panel as the power source 102) and lower voltage DC on an internal side of the membrane (e.g., a side with a battery as the power recipient 114). In this case, the transmitter 104 and the receiver 106 can be roughly tuned to provide a desired ratio of transmit to receive voltages. Controllers of the transmitter 104 and the receiver 106 can use a drive signal on the transmit side to more precisely regulate the voltages on the battery side.

Many off-grid power systems use maximum power point tracking converters. These set an operating voltage of a photovoltaic grid to maximize power transfer, for example. In accordance with one or more aspects, the transmitter 104 and the receiver 106 may be configured to perform this functionality—set the operating voltage of a photovoltaic grid. For instance, the transmitter 104 and the receiver 106 may be configured to set an operating voltage through two-way communication with each other. In some aspects, however, the transmitter 104 and the receiver 106 may be configured to set the operating voltage without such communication. Instead, the system may be configured to utilize power tracking functions from the transmit side alone.

DC-AC scenarios may involve passing DC power across a membrane while changing voltage to an AC waveform. In aspects, this is achieved by incorporating additional circuitry at an output of a power receiver to provide an inversion function that allows two-way current to be transferred. As already described, an inverter can be coupled to the power output 208 of the receiver module 204. Additionally, a communication link may be used to generate a pulsing DC waveform on the transmit side to shape the output current, such as for applications involving grid-tie inverters using low harmonic content sine wave power.

In some aspects, the output current may be shaped without a two-way communication link. Instead, the receiver 106 may be further configured to support grid protection and power point tracking functions itself, without communicating with the transmitter 104. With regard specifically to solar power systems, these can be made up of multiple individual solar panels, which can be difficult to mount and wire. The described aspects can be leveraged in connection with solar power systems so that each individual solar panel has a respective transmitter that is configured according to the described aspects. By configuring each solar panel with a respective transmitter, the effort, cost, and time spent installing solar power systems, including mounting its solar panels, can be reduced.

AC-AC scenarios may involve passing AC power across a membrane. In these scenarios, the transformer, formed by the resonant coil of the transmitter 104 and the resonant coil of the receiver 106, provides isolation for the recipient of the AC power. In general, AC-AC scenarios are similar to the above-described DC-AC scenarios. In contrast to the DC-AC scenarios, however, AC-AC scenarios do not involve preforming a pulsing DC waveform at the transmitter 104. Instead, the transmitter 104 may include a rectifier configured to produce a desired transmitter-side pulsing wave form. The rectifier used in connection with AC-AC scenarios may be configured to have little filtering capacitance relative to capacitances rectifiers can be configured to have.

AC-DC scenarios may involve passing AC power across a membrane and changing to a DC waveform. By way of example, AC-DC scenarios may be used in stationary applications involving both isolation and transformation of voltage. AC-DC scenarios are common, for instance, in applications involving consumer electronics, traction power for railroads, and so on. In AC-DC scenarios, the transmitter 104 may include a rectifier to convert the AC power from the power source 102 to pulsing DC.

In aspects where the power source 102 is a power grid (supplying the AC power), the system may be configured to draw power from the power grid in a "grid-friendly" manner. As used herein, a "grid-friendly manner" refers to a way that is compatible with the power grid. In particular, drawing power from the power grid in a grid-friendly manner corresponds to doing so with a high power factor. In general, the power factor of an AC electrical power system corresponds to a ratio of real power flowing to the load to apparent power in the circuit. Further, the power factor is a dimensionless number having a value in the closed interval of −1 to 1. The described aspects may be configured to achieve a high power factor when drawing power from a power grid in at least a couple different ways. In one example, the transmitter 104 may incorporate a conventional boost converter, which is followed by transmission of less pulsatile DC. In this case, a capacitor of the transmitter 104 may be used to temporarily store energy. In a second example, the receiver 106 may incorporate a boost or buck converter that is configured to draw current from the wireless field 108 proportional to the voltage. In this case, a capacitor of the receiver 106 may be used to store energy.

Techniques of Wireless Power Transfer for Stationary Applications

The following techniques of wireless power transfer for stationary applications may be implemented using any of the previously described wireless power transfer systems, such as the transmitter 104 and the receiver 106 of the example environment. The techniques may also involve the wireless power transfer system described with reference to FIG. 7. Reference to entities, such as the transmitter 104, the receiver 106, the transmitter module 202, and the receiver module 204, is made by example only and is not intended to limit the ways in which the techniques can be implemented. The techniques are described with reference to example methods illustrated in FIGS. 5 and 6. The example methods are depicted as respective sets of operations or acts that may be performed using the entities described herein and/or any suitable components which provide means for implementing one or more of the operations. The depicted sets of operations illustrate a few of the many ways in which the techniques may be implemented. As such, operations of a method may be repeated, combined, separated, omitted, performed in alternate orders, performed concurrently, or used in conjunction with another method or operations thereof.

Figure 5:
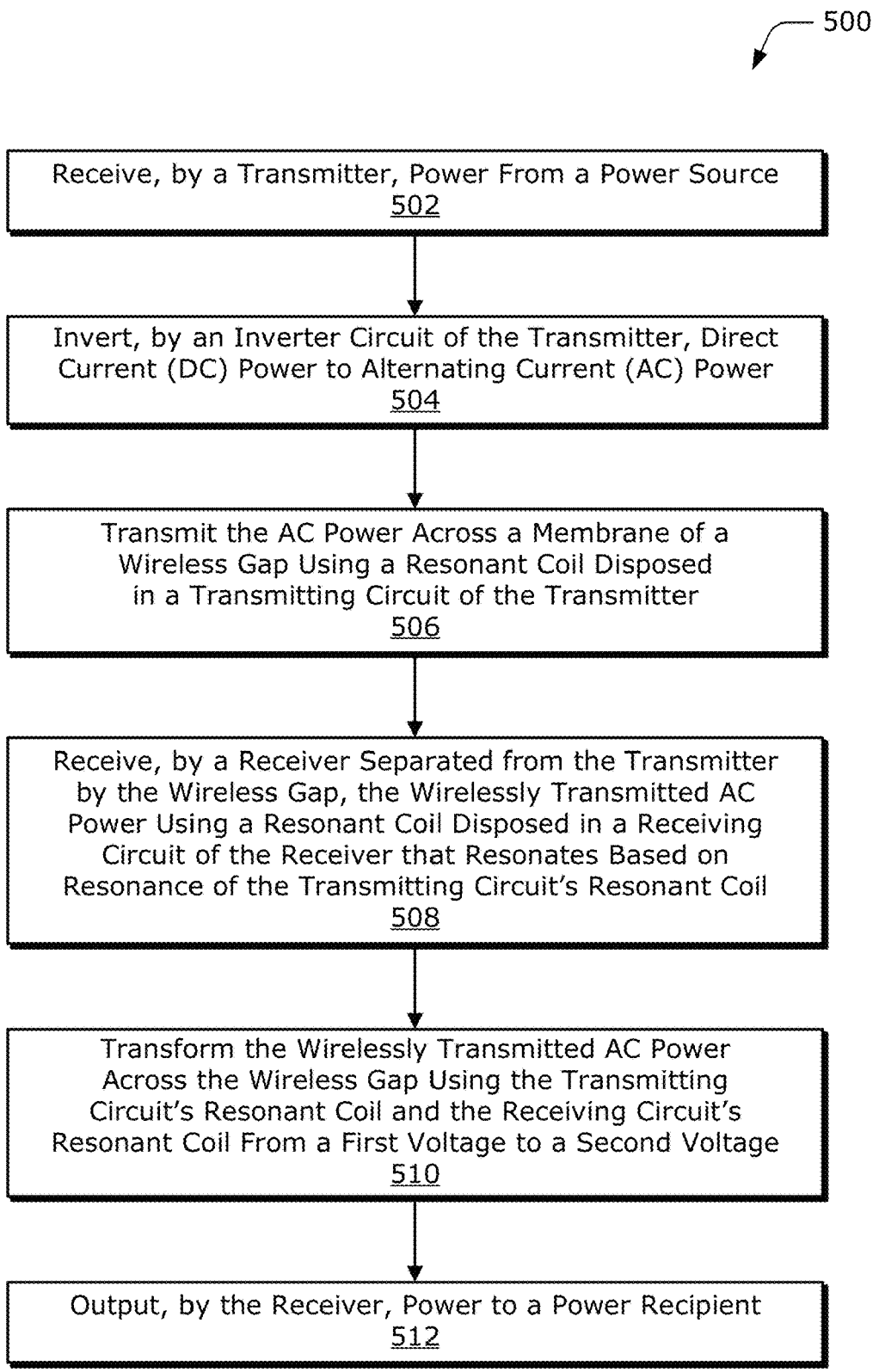
FIG. 5 illustrates an example method for wirelessly transferring and transforming power for stationary applications.

FIG. 5 illustrates an example method 500 of wirelessly transferring power for stationary applications. In the following discussion, the transmitter 104 and the receiver 106 or other entities described herein may provide means for implementing one or more of the operations described.

At 502, the method includes receiving, by a transmitter, power from a power source. By way of example, consider FIG. 1, which illustrates a transmitter 104 and a power source 102 in accordance with one or more aspects generally at 100. In the example, the transmitter 104 is coupled to the power source 102 and receives power from the power source 102. As discussed in more detail above, the power source 102 may be a source of alternating current (AC) power (e.g., a power grid operated by a utility company) or direct current (DC) power (e.g., a solar power system including solar panels as depicted in FIG. 1).

At 504, the method includes inverting DC power to AC power with an inverter circuit of the transmitter. By way of example, the inverter circuit of the transmitter module 202 (e.g., formed from the NMOS transistors 216, 218) inverts DC power to AC power. As discussed above, the transmitter module 202 of FIG. 2 depicts a configuration used when the power source 102 supplies DC power. The transmitter module 202 can also be configured to handle AC power from the power source 102 by incorporating a rectifier. When the power source 102 supplies AC power to the transmitter module 202, an incorporated rectifier rectifies the AC power to DC power, which is then supplied to the inverter circuit.

At 506, the method includes transmitting the AC power across a membrane of a wireless gap. By way of example, the AC power produced by the inverting at 504 is transmitted across the membrane 112 of the wireless gap defined by the distance 110 via the transmitting circuit. To do so, the AC power produced by the inverter circuit of the transmitter module 202 is supplied to the transmitting circuit of the transmitter module 202, which includes the transmitter-side resonant coil 210. The AC power supplied to the transmitting circuit causes the transmitter-side resonant coil 210 to resonate and to produce the wireless field 108, which is effective to transmit the AC power across the membrane 112 of the wireless gap.

At 508, the method includes receiving the wirelessly transmitted AC power by a receiver that is separated from the transmitter by the wireless gap. In accordance with one or more aspects, the wirelessly transmitted power is received using a resonant coil disposed in a receiving circuit of the receiver that resonates based on resonance of the transmitting circuit's resonant coil. By way of example, the receiver module 204 is separated from the transmitter module 202 by the wireless gap defined by the distance 110. Further, the AC power wirelessly transmitted at 506 is received by the receiver module 204. To do so, the receiver-side resonant coil 212 is used to couple to the wireless field 108. This coupling induces current flow in the receiver module 204's receiving circuit, effective to receive the wirelessly transmitted AC power. The induced current flow in the receiver module 204's receiving circuit is effective to receive the wirelessly transmitted AC power.

At 510, the method includes transforming the wirelessly transmitted AC power across the wireless gap from a first voltage to a second voltage. In accordance with one or more aspects, the transmitting circuit's resonant coil and the receiving circuit's resonant coil are used to transform the wirelessly transmitted AC power. In particular, the wirelessly transmitted AC power is transformed from the first voltage at the transmitting circuit's resonant coil to the second voltage at the receiving circuit's resonant coil. By way of example, the AC power transmitted across the wireless gap defined by the distance 110 is transformed by the transmitter-side resonant coil 210 and the receiver-side resonant coil 212—from a first voltage at the transmitter-side resonant coil 210 to a second voltage at the receiver-side resonant coil 212. As described in more detail above, the first voltage may correspond approximately to the voltage of the power source 102. When the power source 102 is solar panels for instance, the first voltage may correspond to high voltage DC supplied by the solar panels. The second voltage may be scaled from the first voltage by a factor that depends on the power recipient 114. When the power recipient 114 is tied to a power grid (e.g., a house that uses grid power), for instance, the second voltage may correspond to grid-compatible AC power.

At 512, the method includes outputting power by the receiver to a power recipient. By way of example, the receiver 106 is coupled to the power recipient 114 and supplies power to the power recipient 114. As discussed in more detail above, the power recipient 114 may use AC power or DC power. Accordingly, the receiver 106 may be configured with a variety of different components as discussed herein to change characteristics of the wirelessly transferred and transformed AC power so that it can be used by the power recipient 114.

Figure 6:
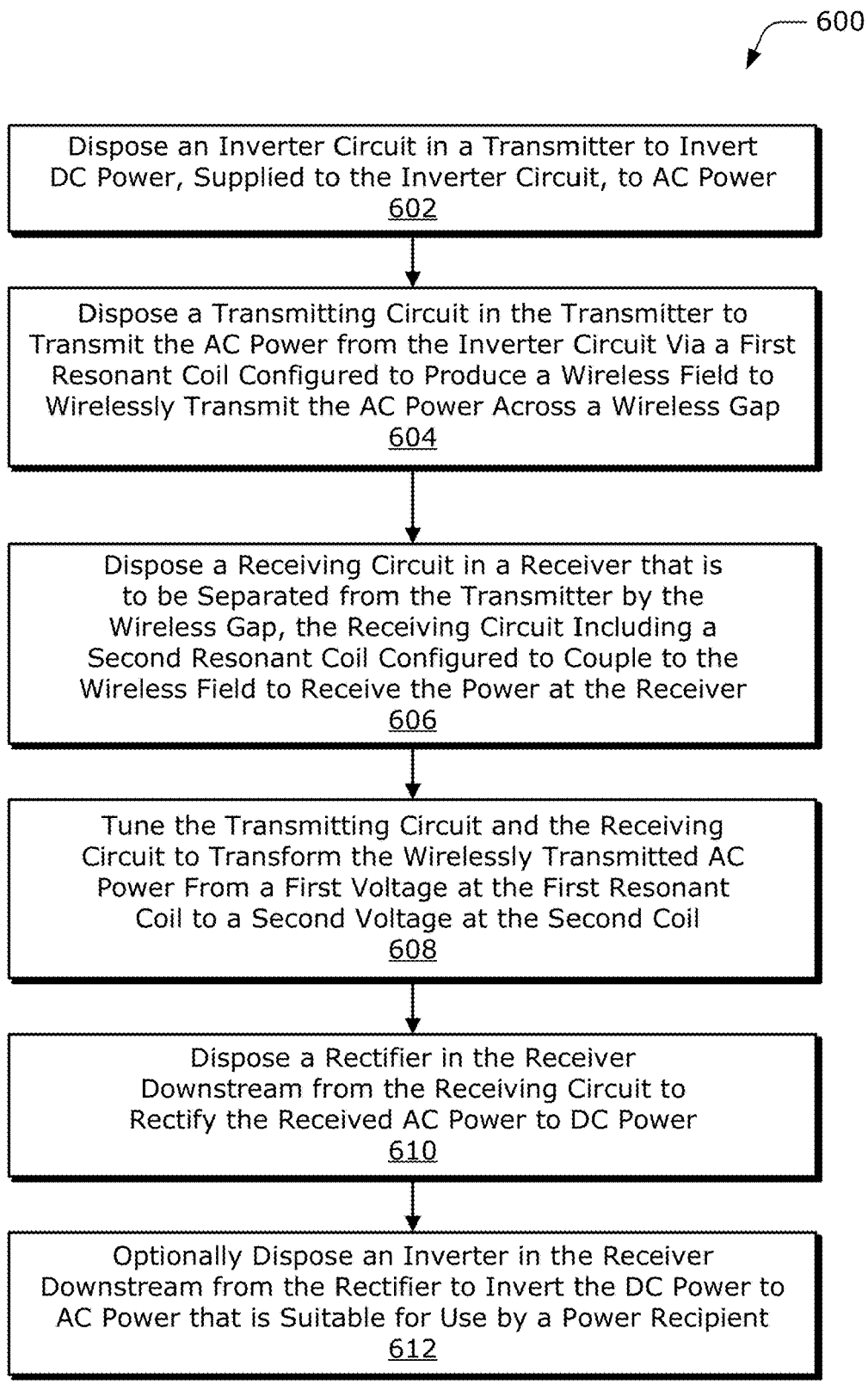
FIG. 6 illustrates an example method for configuring a system to wirelessly transfer and transform power for stationary applications.

FIG. 6 illustrates an example method 600 of configuring a system to wirelessly transfer and transform power for stationary applications. In the following discussion, the transmitter 104 and the receiver 106 or other entities described herein may provide means for implementing one or more of the operations described.

At 602, the method includes disposing an inverter circuit in a transmitter to invert DC power to AC power. In accordance with one or more aspects, the DC power is supplied to the inverter circuit via a coupling to a DC power source or by a rectifier disposed in the transmitter. By way of example, consider FIG. 2, which illustrates a transmitter module 202 having an inverter circuit formed by the NMOS transistors 216, 218. The inverter circuit is disposed in the transmitter module 202 to invert DC power that is supplied to the inverter circuit—by the power input 206 when the power source 102 supplies DC power or by a rectifier (now shown) incorporated in the transmitter module 202 when the power source 102 supplies AC power.

At 604, the method includes disposing a transmitting circuit in the transmitter to transmit the AC power from the inverter circuit across a wireless gap. By way of example, the transmitting circuit with the transmitter-side resonant coil 210 is disposed in the transmitter module 202 to transmit the AC power supplied by the inverter circuit across the wireless gap. The AC power supplied by the inverter circuit to the transmitting circuit causes the transmitter-side resonant coil 210 to resonate and to produce the wireless field 108, which is effective to transmit the AC power across the wireless gap.

At 606, the method includes disposing a receiving circuit in a receiver that is to be separated in operation from the transmitter by the wireless gap. In accordance with one or more aspects, a second resonant coil of the receiving circuit is configured to couple to the wireless field. The coupling induces current flow at the receiving circuit effective to receive the power at the receiver. By way of example, the receiving circuit with the receiver-side resonant coil 212 is disposed in the receiver module 204 to receive the AC power wirelessly transmitted by the transmitting circuit. In particular, coupling to the wireless field 108 by the receiver-side resonant coil induces 212 current flow, effective to receive the wirelessly-transmitted AC power at the receiver module 204. In some aspects, the application may be a stationary application where the transmitter and the receiver are generally in a fixed (e.g., immovable) position such that the distance of the wireless gap generally does not change.

At 608, the method includes tuning the transmitting circuit and the receiving circuit to transform the wirelessly transmitted AC power from a first voltage and frequency at the first resonant coil to a second voltage and frequency at the second resonant coil. By way of example, one or more of the components of the transmitter module 202 and the receiver module 204 are tuned to transform the wirelessly transmitted AC power from a first voltage at the transmitter-side resonant coil 210 to a second voltage at the receiver-side resonant coil 212. The tuning may include inserting different sized coils for the transmitter-side resonant coil 210 and the receiver-side resonant coil 212, tuning tunable capacitors 220, 222, 224, inserting additional components and/or circuits into the transmitter module 202 and the receiver module 204, and so on. In aspects, the tuning can be manually performed by a person using tools for tuning the components of the transmitter module 202 and the receiver module 204, such as oscilloscopes, voltmeters, and so forth. Alternately or in addition, the tuning may be dynamically performed, such as by controllers coupled to the transmitter module 202 and the receiver module 204.

At 610, the method includes disposing a rectifier in the receiver downstream from the receiving circuit to rectify the received AC power to DC power. By way of example, the rectifier represented by the diodes 226, 228 is disposed in the receiver module 204 downstream from the receiving circuit. Further, the rectifier is configured to rectify AC power received from the receiving circuit to DC power. At 612, the method includes optionally disposing an inverter in the receiver downstream from the rectifier to invert the DC power to AC power that is suitable for use by a power recipient. By way of example, an inverter is disposed in the receiver module 204 downstream from the rectifier to invert the DC power produced by the rectifier to AC power. This AC power may be suitable for use by a power recipient configured to use AC power, such as a power grid, devices or appliances tied to a power grid, and so forth.

Wireless Power Transfer System

Figure 7:
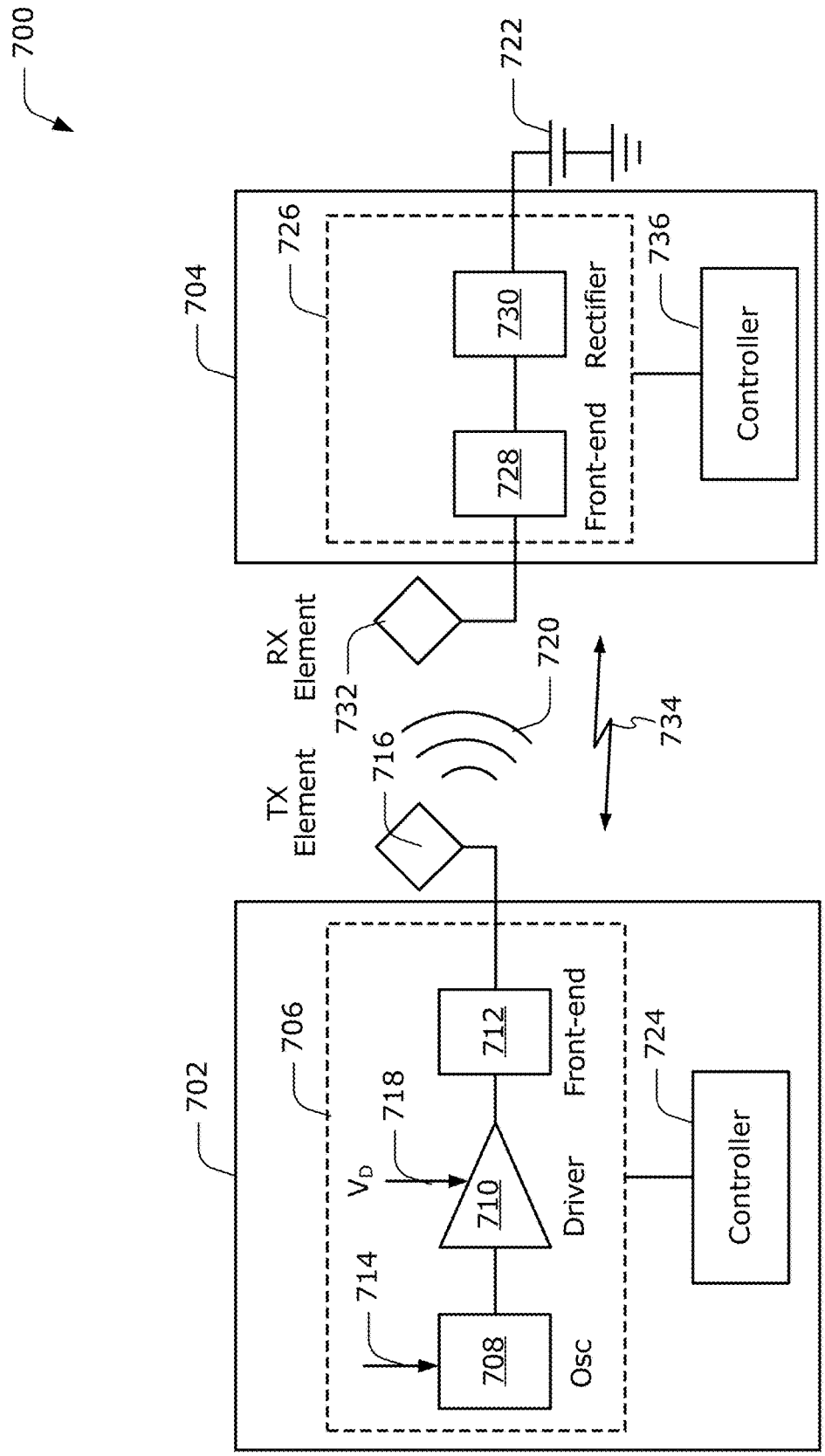
FIG. 7 illustrates a wireless power transfer system having components through which aspects of wireless power transfer for stationary applications can be implemented.

FIG. 7 illustrates an example wireless power transfer system 700, which includes components capable of implementing aspects of wireless power transfer for stationary applications. The system 700 includes a transmitter 702 and a receiver 704. The transmitter 702 (also referred to herein as power transfer unit, PTU) may include transmit circuitry 706 having an oscillator 708, a driver circuit 710, and a front-end circuit 712. The oscillator 708 may be configured to generate an oscillator signal at a desired frequency that may adjust in response to a frequency control signal 714. The oscillator 708 may provide the oscillator signal to the driver circuit 710. The driver circuit 710 may be configured to drive the power transmitting element 716 at, for example, a resonant frequency of the power transmitting element 716 based on an input voltage signal (VD) 718. The driver circuit 710 may be a switching amplifier configured to receive a square wave from the oscillator 708 and output a sine wave.

The front-end circuit 712 may include a filter circuit configured to filter out harmonics or other unwanted frequencies. The front-end circuit 712 may include a matching circuit configured to match the impedance of the transmitter 702 to the impedance of the power transmitting element 716. The front-end circuit 712 may include also a tuning circuit to create a resonant circuit with the power transmitting element 716. As a result of driving the power transmitting element 716, the power transmitting element 716 may generate a wireless field 720 to wirelessly output power at a level sufficient for charging a battery 722, or otherwise powering a load. As one example, the power transmitting element 716 is a coil configured to generate an alternating magnetic field corresponding to the wireless field 720 for inductively coupling power to a receiver coil.

The transmitter 702 may further include a controller 724 operably coupled to the transmit circuitry 706 and configured to control one or more aspects of the transmit circuitry 706, or accomplish other operations relevant to managing the wireless transfer and transformation of power. The controller 724 may be a micro-controller or a processor. The controller 724 may be implemented as an application-specific integrated circuit (ASIC). The controller 724 may be operably connected, directly or indirectly, to each component of the transmit circuitry 706. The controller 724 may be further configured to receive information from each of the components of the transmit circuitry 706 and perform calculations based on the received information. The controller 724 may be configured to generate control signals (e.g., the control signal 714) for each of the components that may adjust the operation of that component. As such, the controller 724 may be configured to adjust or manage the power transfer and transformation based on a result of the operations it performs. The transmitter 702 may further include a memory (not shown) configured to store data, for example, such as instructions for causing the controller 724 to perform particular functions, such as those related to management of wireless power transfer and transformation.

The receiver 704 (also referred to herein as power receiving unit, PRU) may include receive circuitry 726 having a front-end circuit 728 and a rectifier circuit 730. The front-end circuit 728 may include matching circuitry configured to match the impedance of the receive circuitry 726 to the impedance of the power receiving element 732. The front-end circuit 728 may further include a tuning circuit to create a resonant circuit with the power receiving element 732. The rectifier circuit 730 may generate a DC power output from an AC power input to charge the battery 722, as shown in FIG. 7, or provide power to some other load. The receiver 704 and the transmitter 702 may additionally communicate on a separate communication channel 734, e.g., Bluetooth™, ZigBee™, and cellular. The receiver 704 and the transmitter 702 may alternatively communicate via in-band signaling using characteristics of the wireless field 720.

Further, the receiver 704 may be configured to determine whether an amount of power transmitted by the transmitter 702 and received by the receiver 704 is appropriate for charging the battery 722 or powering a load. In certain embodiments, the transmitter 702 may be configured to generate a predominantly non-radiative field with a direct field coupling coefficient (k) for providing energy transfer. The receiver 704 may directly couple to the wireless field 720 and may generate an output power for storing or consumption by the battery 722 (or load), coupled to the output of the receive circuitry 726. For example, in an application where the wireless field 720 is an alternating magnetic field, the power receiving element 732 may be configured as a coil and is configured to generate a voltage in response to the alternating magnetic field and thereby a current is induced to be provided to a load.

The receiver 704 may further include a controller 736 configured similarly to the transmit controller 724 as described above for one or more wireless power management aspects of the receiver 704. The receiver 704 may further include a memory (not shown) configured to store data, such as instructions for causing the controller 736 to perform particular functions, such as those related to management of wireless power transfer and voltage transformation. As discussed above, the transmitter 702 and receiver 704 may be separated by a distance and configured according to a mutual resonant relationship to minimize transmission losses between the transmitter 702 and the receiver 704.

The power transmitting element 716 and the power receiving element 732 may include, respectively, the transmitter-side resonant coil 210 and the receiver-side resonant coil 212 to enable the dual functionality described herein. Further, the described dual functionality may be implemented in the transmitter 702 and the receiver 704 using the transmitter-side resonant coil 210 and the receiver-side resonant coil 212 without incorporating a separate system transformer.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A system for wirelessly transferring and transforming power across a wireless gap that includes a membrane, the system comprising:

a transmitter having an inverter circuit and a transmitting circuit, the inverter circuit configured to invert direct current (DC) power obtained from a DC power source to alternating current (AC) power, the transmitter configured to convert the AC power to pulsing DC power, the transmitting circuit including:
- a first resonant coil configured to resonate at a frequency of the pulsing DC power and to wirelessly transmit the pulsing DC power across the membrane of the wireless gap; and
- a first tunable capacitor coupled to the first resonant coil, the first tunable capacitor being tunable to adjust a resonant frequency of the first resonant coil for wirelessly transmitting the pulsing DC power; and a receiver separated from the transmitter by the wireless gap and having a receiving circuit with a second resonant coil, the second resonant coil configured to resonate based on resonance of the first resonant coil and to receive the wirelessly transmitted pulsing DC power, the receiving circuit including:
- a second tunable capacitor coupled to the second resonant coil, the second tunable capacitor being tunable to adjust a resonant frequency of the second resonant coil, the first and second resonant coils being further configured as primary and secondary windings, respectively, of a transformer to transform, across the wireless gap, the wirelessly transmitted pulsing DC power from a first voltage at the first resonant coil to a second voltage at the second resonant coil that is suitable for use by a power recipient.

2. The system as recited in claim 1, wherein the wirelessly transmitted pulsing DC power is transformed from the first voltage to the second voltage based at least in part on a ratio of turns between the first and second resonant coils.

3. The system as recited in claim 1, wherein the first and second resonant coils are configured with a first number of turns and a second number of turns, respectively, a ratio of the first and second number of turns configured to at least partially control an amount of voltage scaling achieved between the first and second voltages in connection with the transforming.

4. The system as recited in claim 1, wherein the DC power source comprises a solar panel.

5. The system as recited in claim 1, wherein the receiver further includes an output configured to supply a power grid with AC power having the second voltage.

6. The system as recited in claim 1, wherein:
the transmitter is located on an outside of a structure and the DC power source comprises a solar panel mounted on the outside of the structure;
the membrane of the wireless gap comprises at least one of a wall, a roof, a ceiling, a floor, or a window of the structure; and
the receiver is located within the structure.

7. The system as recited in claim 1, wherein the wireless gap corresponds to a fixed distance.

8. The system as recited in claim 1, wherein a size of the first resonant coil is based at least in part on a distance of the wireless gap.

9. The system as recited in claim 8, wherein the first resonant coil has a diameter at least twice as long as the distance of the wireless gap.

10. The system as recited in claim 1, wherein the transmitter is configured to generate a pulsing DC waveform of the pulsing DC power to shape an output current of the receiver.

11. The system as recited in claim 1, wherein the receiver further includes an inverter disposed between the receiving circuit and an output of the receiver, the inverter configured to invert the pulsing DC power to AC power suitable for use by the power recipient.

12. The system as recited in claim 11, wherein the power recipient is tied to a power grid or comprises the power grid.

13. The system as recited in claim 1, wherein the system is configured to adjust at least one of the first voltage at the transmitter or the second voltage at the receiver responsive to at least one communication between the transmitter and the receiver to attain a voltage level.

14. The system as recited in claim 13, wherein the system is configured to adjust at least one of the first voltage or the second voltage to attain the voltage level by adjusting at least one of the first tunable capacitor coupled to the first resonant coil or the second tunable capacitor coupled to the second resonant coil.

15. The system as recited in claim 1, wherein the second voltage corresponds to an open circuit voltage, the receiving circuit further includes a third tunable capacitor coupled to the second resonant coil, and the third tunable capacitor is tunable to adjust the second voltage to a third voltage.

16. A method for wirelessly transferring and transforming power across a wireless gap that includes a membrane, the method comprising:
converting, by a rectifier disposed in a transmitter, alternating current (AC) power to pulsing DC power;
supplying the pulsing DC power to a transmitting circuit disposed in the transmitter, the transmitting circuit including a first resonant coil coupled to a first tunable capacitor that is tunable to adjust a resonant frequency of the first resonant coil, the pulsing DC power causing the first resonant coil to resonate and to propagate a wireless field to a receiver located across the membrane of the wireless gap;
coupling to the wireless field by a second resonant coil of a receiving circuit disposed in the receiver, the receiving circuit including the second resonant coil coupled to a second tunable capacitor that is tunable to adjust a resonant frequency of the second resonant coil, said coupling causing the second resonant coil to resonate and to receive the pulsing DC power at the receiver; and
transforming the pulsing DC power across the wireless gap from a first voltage at the first resonant coil to a second voltage at the second resonant coil by using the first and second resonant coils as primary and secondary windings, respectively, of a transformer such that the pulsing DC power is suitable for use by a power recipient.

17. The method as recited in claim 16, further comprising:
obtaining, by the transmitter, DC power from a DC power source;
supplying the DC power to an inverter circuit disposed in the transmitter; and
inverting, by the inverter circuit, the DC power to the AC power.

18. The method as recited in claim 16, further comprising:
obtaining, by the transmitter, the AC power from an AC power source; and
supplying the AC power to the rectifier.

19. The method as recited in claim 16, further comprising rectifying, by a rectifier disposed in the receiver, AC power that is derived from the pulsing DC power at the receiver to DC power.

20. The method as recited in claim 16, further comprising outputting, by the receiver, power suitable for use by the power recipient by adjusting at least one of the first voltage at the transmitter or the second voltage at the receiver responsive to at least one communication between the transmitter and the receiver to attain a voltage level.

21. The method as recited in claim 20, wherein the power suitable for use by the power recipient comprises a voltage suitable for use by a grid-tied power recipient.

22. A method for configuring a system to wirelessly transfer and transform power across a wireless gap, the method comprising:
 disposing a rectifier in a transmitter to convert alternating current (AC) power to pulsing DC power;
 disposing a transmitting circuit in the transmitter to transmit the pulsing DC power produced by the rectifier, the transmitting circuit including:
  a first resonant coil configured to resonate based on the pulsing DC power produced by the rectifier and to wirelessly transmit the pulsing DC power across the wireless gap; and
  a first tunable capacitor coupled to the first resonant coil, the first tunable capacitor being tunable to adjust a resonant frequency of the first resonant coil for wirelessly transmitting the pulsing DC power;
 disposing a receiving circuit in a receiver configured to be separated from the transmitter by the wireless gap, the receiving circuit including:
  a second resonant coil configured to resonate based on resonance of the first resonant coil and to receive the wirelessly transmitted pulsing DC power at the receiver; and
  a second tunable capacitor coupled to the second resonant coil, the second tunable capacitor being tunable to adjust a resonant frequency of the second resonant coil; and
 tuning, using at least one of the first or second tunable capacitor, the transmitting circuit or the receiving circuit to enable the first and second resonant coils to serve as primary and secondary windings, respectively, of a transformer configured to transform the wirelessly transmitted pulsing DC power from a first voltage at the first resonant coil to a second voltage at the second resonant coil that is suitable for use by a power recipient.

23. The method as recited in claim 22, further comprising disposing an inverter circuit in the transmitter upstream from the rectifier to invert direct current (DC) power to generate the AC power.

24. The method as recited in claim 22, wherein the power recipient comprises an AC power recipient; and further comprising disposing an inverter in the receiver downstream from the receiving circuit to invert the pulsing DC power received by the receiving circuit to AC power suitable for the AC power recipient.

25. The method as recited in claim 22, wherein the tuning comprises at least one of:
 tuning the transmitting circuit using the first tunable capacitor responsive to at least one communication between the transmitter and the receiver that is indicative of a voltage level; or
 tuning the receiving circuit using the second tunable capacitor responsive to the at least one communication.

26. The method as recited in claim 25, wherein:
 the receiving circuit includes a third tunable capacitor;
 the second tunable capacitor is coupled to one side of the second resonant coil, and the third tunable capacitor is coupled to another side of the second resonant coil;
 the one side of the second resonant coil corresponds to the second voltage, and the other side of the second resonant coil corresponds to a third voltage; and
 the method further comprises adjusting the third voltage by tuning the third tunable capacitor.

27. The method as recited in claim 22, further comprising coupling an input of the transmitter to a power source to supply power for transfer from the transmitter to the receiver across the wireless gap.

28. An apparatus for wirelessly transferring and transforming power across a wireless gap that includes a membrane, the apparatus comprising:
 inverting means for inverting direct current (DC) power obtained from a DC power source to alternating current (AC) power;
 rectifying means for rectifying the AC power to pulsing DC power;
 transmitting means coupled to the rectifying means and having first resonant means for resonating at least near a frequency of the pulsing DC power produced by the rectifying means to wirelessly transmit the pulsing DC power across the membrane of the wireless gap, the transmitting means including first capacitive means for tuning a first capacitance coupled to the first resonant means; and
 receiving means separated from the transmitting means by the wireless gap and having second resonant means for resonating based on resonance of the first resonant means to receive the wirelessly transmitted pulsing DC power, the receiving means including second capacitive means for tuning a second capacitance coupled to the second resonant means,
 the first and second resonant means being further for transforming, across the wireless gap, the wirelessly transmitted pulsing DC power from a first voltage at the first resonant means to a second voltage at the second resonant means that is suitable for use by a power recipient.

29. The apparatus as recited in claim 28, further comprising communication means integral with the transmitting means and the receiving means for communicating to adjust at least one of:
 the resonance of the first resonant means to change the frequency of the wirelessly transmitted pulsing DC power using the first capacitive means;
 the resonance of the first resonant means at which the second resonant means is configured to resonate using the second capacitive means;
 the first voltage; or
 the second voltage.

30. The apparatus as recited in claim 29, further comprising controlling means integral with at least one of the transmitting means or the receiving means for handling at least one adjustment in accordance with at least one communication that is communicated by the communication means between the transmitting means and the receiving means.

* * * * *